(12) United States Patent
Yamaguchi et al.

(10) Patent No.: US 9,798,603 B2
(45) Date of Patent: Oct. 24, 2017

(54) COMMUNICATION DEVICE, ROUTER HAVING COMMUNICATION DEVICE, BUS SYSTEM, AND CIRCUIT BOARD OF SEMICONDUCTOR CIRCUIT HAVING BUS SYSTEM

(71) Applicant: Panasonic Intellectual Property Management Co., Ltd., Osaka (JP)

(72) Inventors: Takao Yamaguchi, Osaka (JP); Atsushi Yoshida, Osaka (JP); Tomoki Ishii, Kyoto (JP); Satoru Tokutsu, Saitama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 269 days.

(21) Appl. No.: 14/708,403

(22) Filed: May 11, 2015

(65) Prior Publication Data
US 2015/0242261 A1  Aug. 27, 2015

Related U.S. Application Data

(63) Continuation of application No. PCT/JP2013/006547, filed on Nov. 6, 2013.

(30) Foreign Application Priority Data

Nov. 29, 2012 (JP) ................. 2012-261013

(51) Int. Cl.
G06F 11/00 (2006.01)
G06F 11/07 (2006.01)
H04L 1/00 (2006.01)

(52) U.S. Cl.
CPC ........ *G06F 11/076* (2013.01); *G06F 11/0745* (2013.01); *H04L 1/0041* (2013.01); *H04L 1/0086* (2013.01); *H04L 2001/0094* (2013.01)

(58) Field of Classification Search
USPC ........................................ 714/47.1
See application file for complete search history.

(56) References Cited

U.S. PATENT DOCUMENTS

2003/0163762 A1* 8/2003 Lee .................. H04L 1/22
714/11
2003/0208704 A1* 11/2003 Bartels .............. H04L 1/22
714/11

(Continued)

FOREIGN PATENT DOCUMENTS

JP  2003-229815 A  8/2003
JP  2004-364059 A  12/2004

(Continued)

OTHER PUBLICATIONS

International Search Report for corresponding International Application No. PCT/JP2013/006547 mailed Feb. 10, 2014.

(Continued)

*Primary Examiner* — Sarai Butler
(74) *Attorney, Agent, or Firm* — Renner, Otto, Boisselle & Sklar, LLP

(57) ABSTRACT

A communication device includes: a receiving terminal; a storage device which stores a rule in which a condition regarding a bus system operation environment and an error tolerance scheme are associated with each other, and information regarding a path length; an error processor which determines the error tolerance scheme by utilizing the condition regarding the bus system operation environment and the rule so as to generate error tolerance information corresponding to the received data according to the determined error tolerance scheme; and a sending terminal for sending at least one packet including the error tolerance information and the data to the bus. The operation environment-related condition is a condition for granting an error tolerance for a transmission path of which a bus path length to another (Continued)

communication device, which is a destination of the data, is greater than a predetermined value.

14 Claims, 18 Drawing Sheets

(56) References Cited

U.S. PATENT DOCUMENTS

| | | | |
|---|---|---|---|
| 2006/0010352 A1* | 1/2006 | Mukherjee | G06F 11/0724 714/47.2 |
| 2007/0201428 A1 | 8/2007 | Morita et al. | |
| 2011/0106992 A1 | 5/2011 | Lee et al. | |
| 2012/0044942 A1 | 2/2012 | Yamaguchi et al. | |

FOREIGN PATENT DOCUMENTS

| | | | |
|---|---|---|---|
| JP | 2005-025587 A | 1/2005 |
| JP | 2006-129277 A | 5/2006 |
| JP | 2007-235355 A | 9/2007 |
| JP | 2011-101372 A | 5/2011 |
| WO | WO 2011/089899 A1 | 7/2011 |

OTHER PUBLICATIONS

International Preliminary Report on Patentability for corresponding International Application No. PCT/JP2013/006547 dated Dec. 16, 2014.

Wang et al., "Design of Low Power On-chip Router with Error-detection Re-transfer Scheme", IPSJ SIG Technical Report, vol. 2011-ARC-193, No. 18, Jan. 21, 2011.

\* cited by examiner (a) HD  (b) 4K2K  (c) 8K4K (a) HD  (b) 4K2K  (c) 8K4K

| BUS VOLTAGE | BUS OPERATING FREQUENCY | NUMBER OF RELAY STAGES | MODE OF CONNECTION | ERROR TOLERANCE SCHEME |
|---|---|---|---|---|
| 3V | 300Mhz | 2 | BETWEEN SoCS | CRC + RESEND |
| 5V | 200Mhz | 5 | WITHIN SoC | PARITY |
| 5V | 150Mhz | 2 | WITHIN SoC | NONE |
| : | : | | | : |

COMMUNICATION DEVICE, ROUTER HAVING COMMUNICATION DEVICE, BUS SYSTEM, AND CIRCUIT BOARD OF SEMICONDUCTOR CIRCUIT HAVING BUS SYSTEM

This is a continuation of International Application No. PCT/JP2013/006547, with an international filing date of Nov. 6, 2013, which claims priority of Japanese Patent Application No. 2012-261013, filed on Nov. 29, 2012, the contents of which are hereby incorporated by reference.

BACKGROUND

1. Technical Field

The present disclosure relates to a communication device, method and program in a semiconductor system having a bus.

2. Description of the Related Art

FIG. 1(a) shows an example centralized bus control. With a conventional integrated circuit performing a centralized bus control, the connection between a plurality of bus masters and a memory device is primarily made by a single bus, and an arbiter arbitrates between bus masters for access to the memory device. However, an integrated circuit now has an enhanced functionality and multiple cores, thereby increasing the circuit scale, with traffic flows flowing through the bus while varying in a complicated manner, thus making it more difficult to design an integrated circuit based on a centralized bus control.

On the other hand, semiconductor integrated circuits have been developed recently which have distributed buses incorporating connection techniques of parallel computing and network control techniques such as the ATM (Asynchronous Transfer Mode) network. FIG. 1(b) shows an example distributed bus control. A semiconductor integrated circuit with distributed buses has a configuration where a plurality of routers are connected together by a plurality of buses. Recently, efforts have been made for a network on chip (NoC) where traffic flows in an integrated circuit of an increased scale are transmitted while being distributed among a plurality of buses, using distributed buses as shown in FIG. 1(b).

The traffic flows on a bus of a semiconductor device have been increasing each year. Therefore, in order to maintain the bus transmission performance, it is necessary to increase the bus operating frequency or the bus width in accordance with the increase in the traffic flows even with the NoC described above.

Moreover, in connection with this, there are also influences of the decrease in the voltage of semiconductor devices, and influences of the increase in the line length, which are deriving from the increase in the scale of the system.

FIGS. 2(a) to 2(c) show an example of how the scale of a video chip has increased. In FIG. 2, (a) shows the size of a high-definition (HD) video chip, (b) shows the size of a so-called "4K2K" video chip, and (c) shows the size of a so-called "8K4K" video chip. The size of a chip tends to increase as the amount of data to be handled increases.

Design of Low Power On-chip Router with Error-detection Re-transfer Scheme, Information Processing Society of Japan Study Report (January 2011)(hereinafter referred to as "Non-Patent Document No. 1") points out influences of the decrease in the voltage of semiconductor devices and the increase in the line length of the system, and also points out transmission errors occurring on the bus deriving from those influences (Non-Patent Document No. 1).

SUMMARY

The prior art technique needs further improvement to maintain the bus transmission performance of an NoC. For example, it is required to perform error corrections at necessary locations and at necessary timings, and to prevent transmissions with transmission errors uncorrected. There is also a demand for reducing the area and the process overhead, and for reinforcing the error tolerance function of an existing NoC in a simple manner.

A non-limiting example embodiment of the present application provides a technique for reducing the footprint and the process overhead and for reinforcing the error tolerance function in a simple manner.

In order to solve the problem above, one embodiment of the present invention is a communication device for use in a bus system of a semiconductor circuit having a sending node and a receiving node and including a bus over which data is transmitted by a packet switching scheme, the communication device including: a receiving terminal for receiving a packet via a bus; a storage device which stores a rule in which a condition regarding a bus system operation environment and an error tolerance scheme are associated with each other, and information regarding a path length; an error processor which determines the error tolerance scheme by utilizing the condition regarding the bus system operation environment and the rule so as to generate error tolerance information corresponding to the received data according to the determined error tolerance scheme; and a sending terminal for sending at least one packet including the error tolerance information and the data to the bus, wherein the condition regarding the bus system operation environment is a condition for granting an error tolerance for a transmission path of which a path length of the bus to another communication device, which is a destination of the data, is greater than a predetermined value.

The general and particular embodiment set forth above can be implemented by using a system, a method and a computer program, or by using a combination of a system, a method and a computer program.

An example embodiment of the present disclosure provides a network connection in a network on chip or a network connection between System On Chips (SoCs), whereby it is possible to reduce the footprint and the process overhead and to reinforce the error tolerance function in a simple manner.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

As described above, Non-Patent Document No. 1 points out the occurrence of transmission errors on buses in general. The present inventors further studied this problem in view of the implementation.

For example, a possible method is to utilize four HD video chips to produce a 4K2K video chip. Similarly, a possible method is to utilize four 4K2K video chips or 16 HD video chips to produce an 8K4K video chip. Moreover, a possible method is to combine a plurality of existing image processing circuits together to produce an HD, 4K2K or 8K4K chip. In each case, the object is to effectively utilize existing chips and avoid increasing the development cost. These chips are connected together via networked buses.

Figure 1:
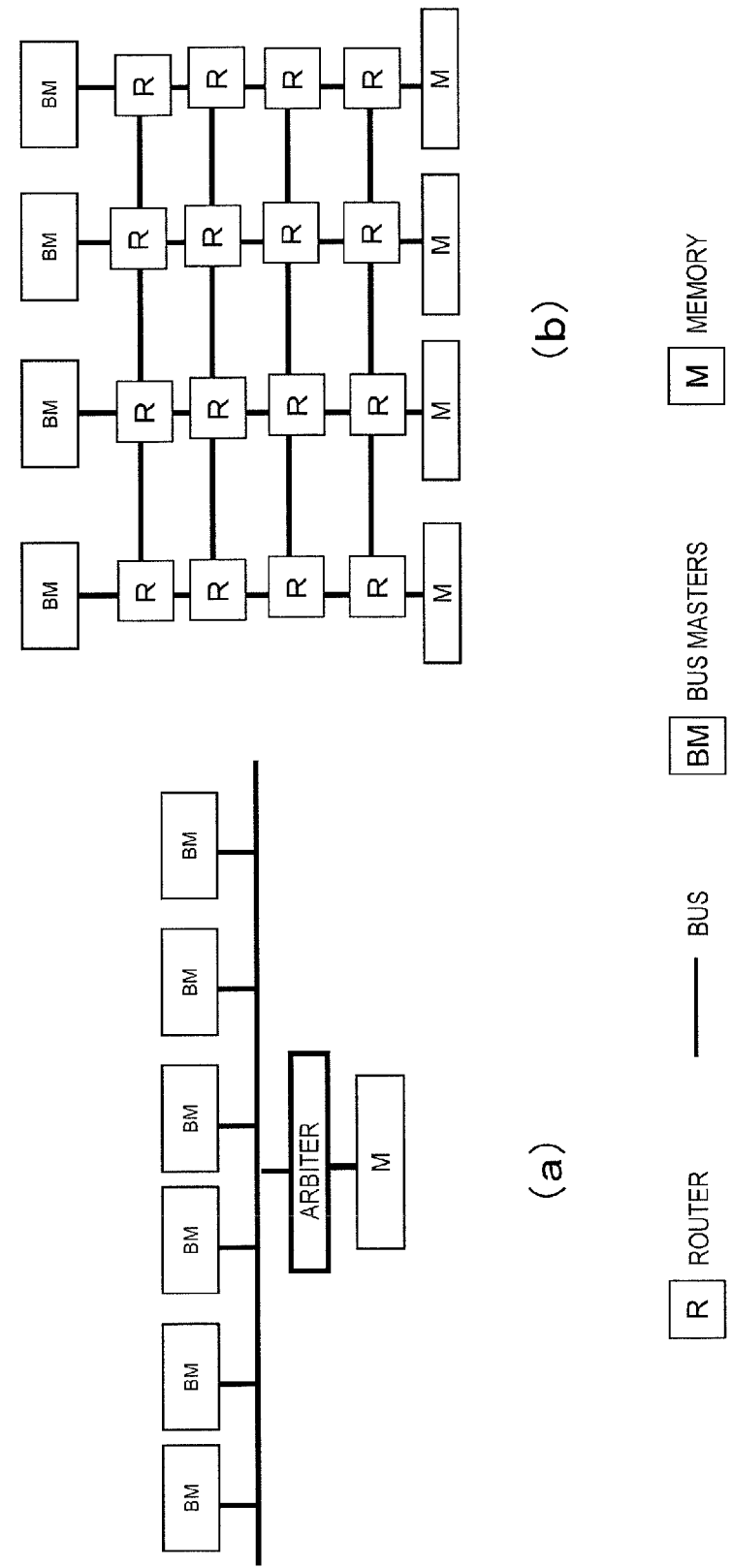
FIG. 1 shows examples of a centralized bus control, and a distributed bus control.
Figure 2:
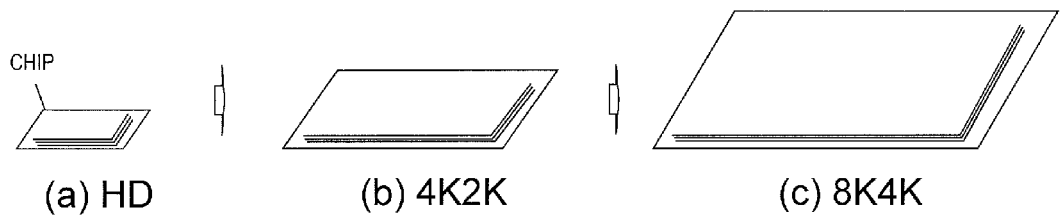
FIG. 2 shows an example of how the scale of a video chip has increased.
Figure 3:
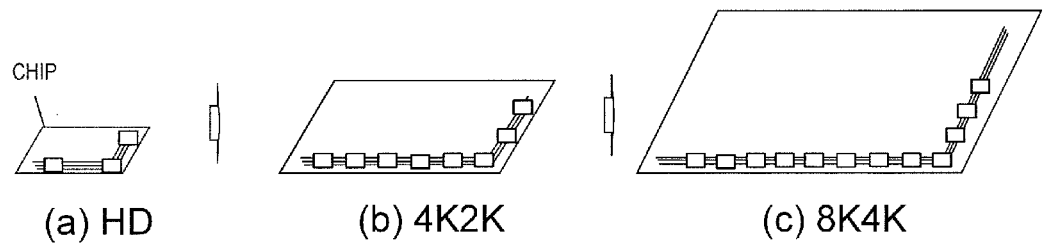
FIG. 3 schematically shows a networked HD chip, a networked 4K2K chip, and a networked 8K4K chip.

Buses generally include sending nodes for sending data, routers for relaying the transmission of data, and receiving nodes for receiving data. FIGS. 3(a) to 3(c) schematically show a networked HD chip, a networked 4K2K chip, and a networked 8K4K chip. FIGS. 3(a) to 3(c) schematically show sending/receiving nodes, routers, etc., which are connected together via networked buses.

In each configuration described above, a plurality of chips are connected together via buses. Then, there is a possibility that transmission errors may occur during transmission between chips.

Figure 4:
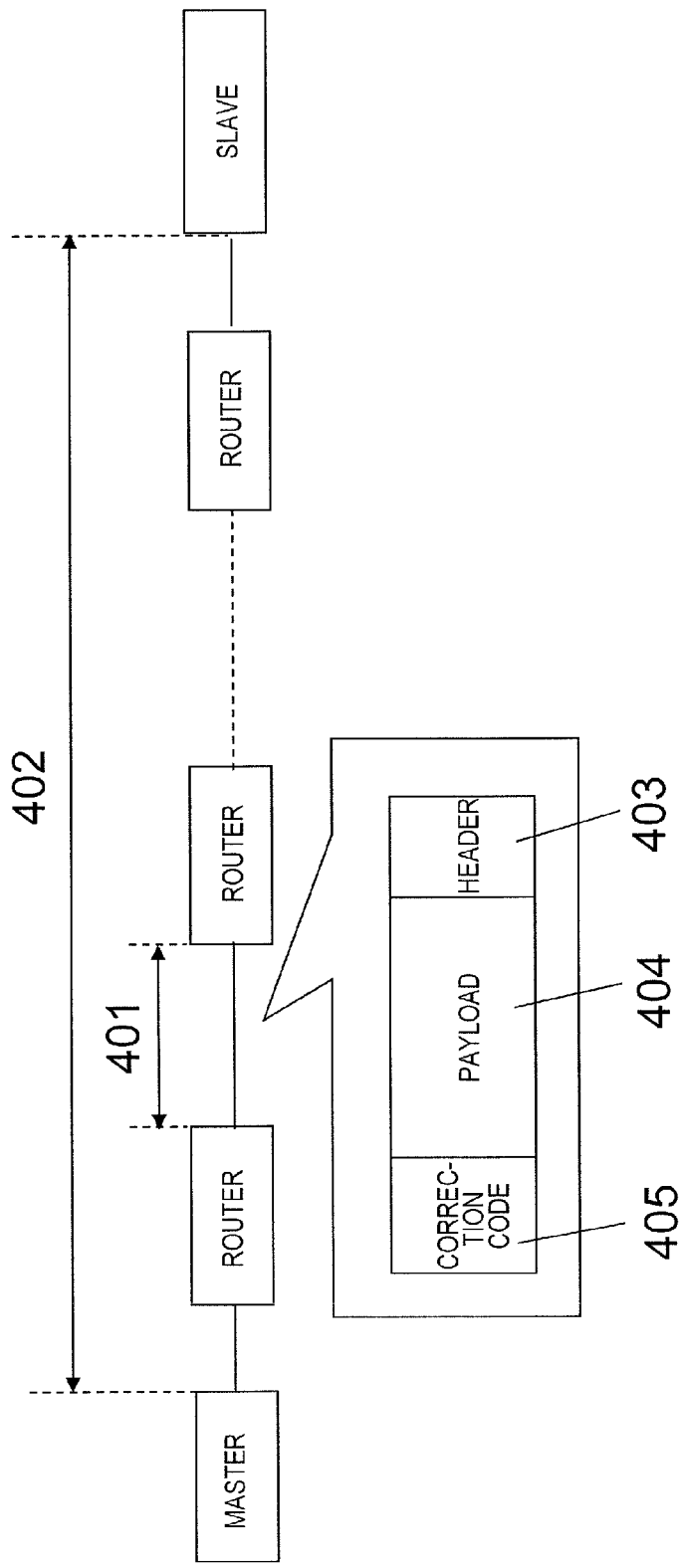
FIG. 4 shows an example using an error tolerance granting technique.

FIG. 4 shows an example using an error tolerance granting technique. The figure shows, for example, a master corresponding to a sending node, a slave corresponding to a receiving node, and a model whereby they are connected together via routers.

The transmission path to which an error tolerance is granted may be one of the following two: a transmission path 401 connecting two routers together, and a transmission path 402 along which three or more routers are connected together in multiple stages.

Non-Patent Document No. 1 proposes a method for distinguishing the header and the payload from each other to grant different error tolerances thereto. With this method, however, each router needs to perform the error tolerance process. Each router needs to analyze the packet structure, read out error tolerance information with which data is provided, so as to perform an error correction.

In the illustrated example, one packet includes a header 403, a payload 404, and an error correction code 405. If network elements of an NoC system were to perform processes for the error tolerance function, the error tolerance processes will lead to problems including an increase in the footprint and the process overhead, also problems in terms of the reusability and general-purposeness of NoC.

In view of this, the present disclosure provides a technique for reinforcing the error tolerance function in a simple manner by reducing the footprint and the process overhead.

Below is an outline of one embodiment of the present disclosure.

A first embodiment of the present disclosure is a communication device for use in a bus system of a semiconductor circuit having a sending node and a receiving node and including a bus over which data is transmitted by a packet switching scheme. The communication device includes: a receiving terminal which receives one or more packets via a bus; a storage device which stores a rule in which a condition regarding a bus system operation environment and an error tolerance scheme are associated with each other, and information regarding a path length; an error processor which determines the error tolerance scheme by utilizing the condition regarding the bus system operation environment and the rule so as to generate error tolerance information corresponding to the received data according to the determined error tolerance scheme; and a sending terminal which sends at least one packet including the error tolerance information and the data to the bus. The condition regarding the bus system operation environment is a condition for granting an error tolerance for a transmission path of which a path length of the bus to another communication device, which is a destination of the data, is greater than a predetermined value.

In one embodiment, the condition regarding the bus system operation environment is a condition for granting an error tolerance in relation to at least one of: a frequency of the bus; an operating voltage of the bus; a path length of the bus to the other communication device; and an error rate received from the other communication device.

In one embodiment, the error processor receives the condition regarding the bus system operation environment from another device provided in the bus system.

In one embodiment, the error processor generates a packet of the data and a packet of the error tolerance information; and the sending terminal sends the packet of the data and the packet of the error tolerance information independently of each other.

In one embodiment, the error processor generates an extended packet including a packet of the data and the error tolerance information; and the sending terminal sends the extended packet.

In one embodiment, where the error tolerance information is first error tolerance information; the error processor determines the error tolerance scheme by referring to the rule based on the condition regarding the bus system operation environment so as to further generate second error tolerance information for correcting an error occurring while transmitting the first error tolerance information; and the sending terminal sends at least one packet including the first error tolerance information, the second error tolerance information and the data to the bus.

The bus includes a data bus to transmit one or more packets of the data, and an address bus to transmit address information indicating a destination of the packet; and the sending terminal transmits at least one packet including the data to the data bus, and sends the error tolerance information to the address bus.

In one embodiment, if the condition regarding the bus system operation environment is a condition for granting an error tolerance in relation to an error rate received from the other communication device, the error processor generates error tolerance information corresponding to the received data according to an error tolerance scheme different from the determined error tolerance scheme.

In one embodiment, a packet of first data with a relatively large acceptable delay amount and a packet of second data with a relatively small acceptable delay amount are transmitted over the bus; a first transmission path to the other communication device, and a second transmission path of which a path length is shorter than the first transmission path are present along the bus; and if the condition regarding the bus system operation environment is a condition for granting an error tolerance in relation to a path length of the bus to the other communication device, the error processor generates error tolerance information corresponding to the packet of the first data; and the sending terminal transmits at least one packet including the error tolerance information and the data to the first transmission path.

A second embodiment of the present disclosure is a communication device for use in a bus system of a semiconductor circuit having a sending node and a receiving node for transmitting data by a packet switching scheme. The communication device includes: a receiving terminal which receives at least one packet including data and error tolerance information; an error processor which carries out an error correction process for a packet of the data by utilizing the error tolerance information; and a sending terminal which sends the packet of data having undergone the error correction process to the receiving node.

One embodiment of the present disclosure is a router for use in the bus system for relaying the packet, the router including the communication device set forth above.

One embodiment of the present disclosure is a bus system of a semiconductor circuit including: a sending node which sends one or more packets including data; a first communication device of claim 1 receiving the one or more one or more packets, which sends at least one packet including the data and the error tolerance information to the bus; a second communication device of claim 10 receiving the at least one packet sent from the first communication device, which sends one or more packets of the data having undergone the error correction process; and a receiving node which receives the one or more packets of the data sent from the second communication device.

In one embodiment, the bus system further includes a router which relays packets.

In one embodiment, the sending node and the first communication device are provided on a first semiconductor chip circuit; the second communication device and the receiving node are provided on a second semiconductor chip circuit different from the first semiconductor chip; and the first semiconductor chip circuit and the second semiconductor chip circuit are connected together by a bus.

One embodiment of the present disclosure is a circuit board of a semiconductor circuit having a bus system set forth above.

A first embodiment of the present disclosure is a communication device for use in a bus system of a semiconductor circuit having a sending node and a receiving node and including a bus over which data is transmitted by a packet switching scheme. The communication device includes: a receiving terminal which receives one or more packets via a bus; a storage device which stores a rule in which a condition regarding a bus system operation environment and an error tolerance scheme are associated with each other; an error processing processor which determining the error tolerance scheme by utilizing the condition regarding the bus system operation environment and the rule so as to generate error tolerance information corresponding to the received data according to the determined error tolerance scheme; and a sending terminal which sends at least one packet including the error tolerance information and the data to the bus.

In one embodiment, the condition regarding the bus system operation environment is a condition for granting an error tolerance in relation to at least one of: a frequency of the bus; an operating voltage of the bus; a path length of the bus to the other communication device receiving the error tolerance information; and an error rate received from the other communication device receiving the error tolerance information.

In one embodiment, the error processor receives the condition regarding the bus system operation environment from another device provided in the bus system.

In one embodiment, the error processor generates a packet of the data and a packet of the error tolerance information; and the sending terminal sends the packet of the data and the packet of the error tolerance information independently of each other.

In one embodiment, the error processor generates an extended packet including a packet of the data and the error tolerance information; and the sending terminal sends the extended packet.

In one embodiment, where the error tolerance information is first error tolerance information; the error processor determines the error tolerance scheme by referring to the rule based on the condition regarding the bus system operation environment so as to further generate second error tolerance information for correcting an error occurring while transmitting the first error tolerance information; and the sending terminal sends at least one packet including the first error tolerance information, the second error tolerance information and the data to the bus.

In one embodiment, the bus includes a data bus to transmit one or more packets of the data, and an address bus to transmit address information indicating a destination of the packet; and the sending terminal transmits at least one packet including the data to the data bus, and sends the error tolerance information to the address bus.

In one embodiment, where the condition regarding the bus system operation environment is an error rate received from the other communication device receiving the error tolerance information, the error processor generates error tolerance information corresponding to the received data according to an error tolerance scheme different from the determined error tolerance scheme.

In one embodiment, a packet of first data with a relatively large acceptable delay amount and a packet of second data with a relatively small acceptable delay amount are transmitted over the bus; a first transmission path to the other communication device, and a second transmission path of which a path length is shorter than the first transmission path are present along the bus; and if the condition regarding the bus system operation environment is a path length of the bus to the other communication device, the error processor generates error tolerance information corresponding to the packet of the first data; and the sending terminal transmits at least one packet including the error tolerance information and the data to the first transmission path.

A second embodiment of the present disclosure is a communication device for use in a bus system of a semiconductor circuit having a sending node and a receiving node for transmitting data by a packet switching scheme. The communication device includes: a receiving terminal which receives at least one packet including data and error tolerance information; an error processor which carries out an error correction process for a packet of the data by utilizing the error tolerance information; and a sending terminal which sends the packet of data having undergone the error correction process to the receiving node.

One embodiment of the present disclosure is a router for use in the bus system for relaying the packet, the router including the communication device set forth above.

One embodiment of the present disclosure is a bus system of a semiconductor circuit including: a sending node which sends one or more packets including data; a first communication device of claim 1 receiving the packet, which sends at least one packet including the data and the error tolerance information to the bus; a second communication device of claim 10 receiving the at least one packet sent from the first communication device, which sends one or more packets of the data having undergone the error correction process; and a receiving node which receives the one or more packets of the data sent from the second communication device.

In one embodiment, the bus system further includes a router which relays packets.

In one embodiment, the sending node and the first communication device are provided on a first semiconductor chip circuit; the second communication device and the receiving node are provided on a second semiconductor chip circuit different from the first semiconductor chip; and the first semiconductor chip circuit and the second semiconductor chip circuit are connected together by a bus.

One embodiment of the present disclosure is a circuit board of a semiconductor circuit having a bus system set forth above.

Embodiments of a reliable communication device and a reliable communication method according to the present disclosure will now be described with reference to the drawings. Here, "reliable" means that the bus transmission can be used reliably without losing data transmitted by the process based on the present disclosure. However, a reliable communication device and a reliable communication method will be hereinafter referred to simply as a "communication device" and a "communication method". Note that in the present embodiment, the term "network on chip" or "NoC" includes not only a bus in a system on chip (SoC) but also a bus connecting between SoCs.

<1. Configuration of Bus System>

Figure 5:
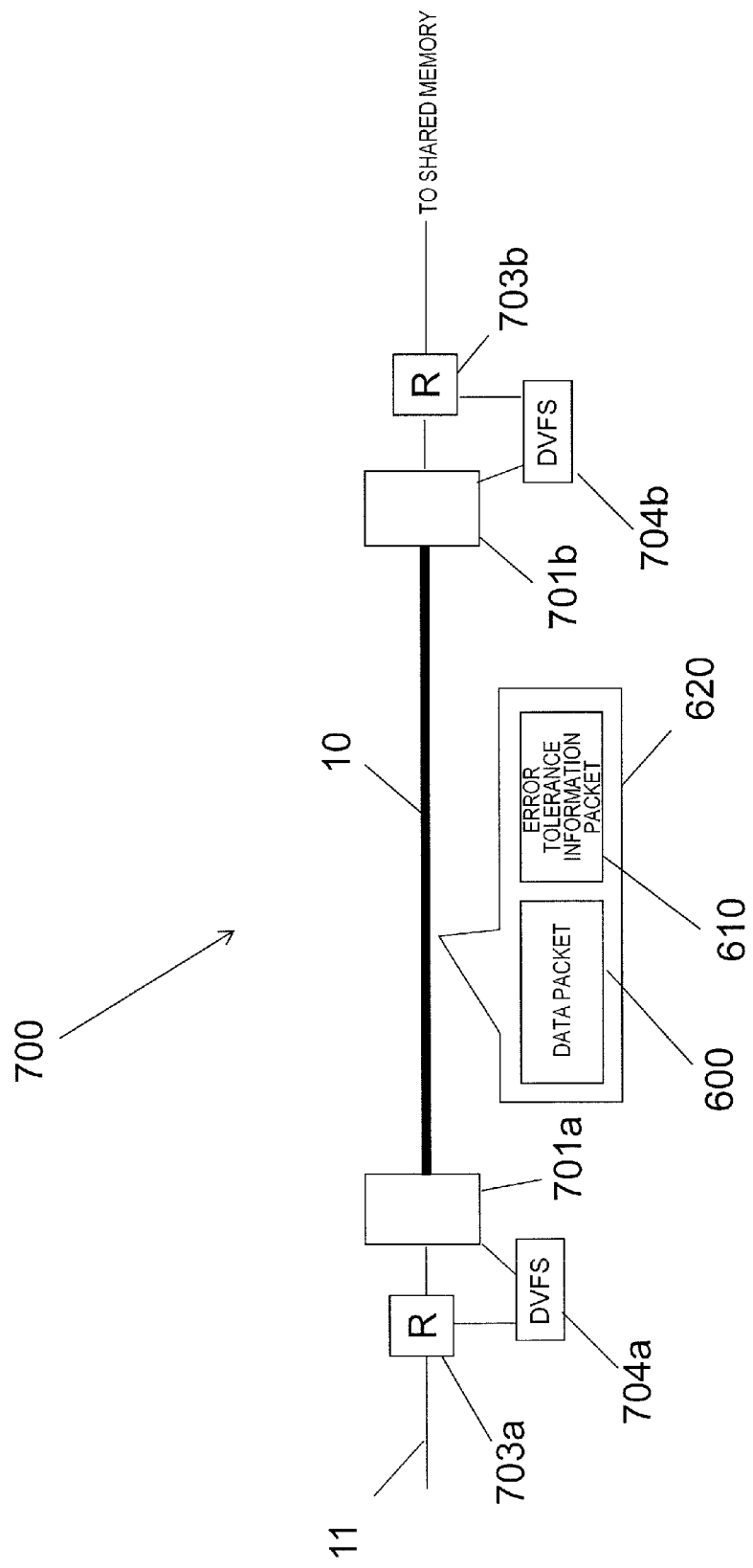
FIG. 5 schematically shows a configuration of a bus system 700 according to an embodiment of the present disclosure.

FIG. 5 schematically shows a configuration of a bus system 700 of the present embodiment. The bus system 700 includes a system bus 10, and two communication devices 701a and 701b provided, as a pair, at opposite ends of the system bus 10. A "system bus" is, for example, a bus that connects a plurality of local buses together, and that serves as the backbone whereby the local buses can access a shared memory device.

In the present example embodiment, the communication device 701a sends a packet 600 of data and a packet 610 of error tolerance information, addressed to the communication device 701b, to the system bus 10.

The communication device 701a transmits the packet 600 of data and the packet 610 of error tolerance information each as an independent packet. The communication device 701b on the receiving side needs to identify a packet 600 of data to which the error tolerance information in the packet 610 is to be applied. Therefore, an error tolerance packet processor 805 of the communication device 701a on the sending side gives the same packet ID to both of the packets. Thus, the communication device 701b on the receiving side can identify the correlation between the packets. Note that the type of data stored in each packet is described in the data type field of the header. This will later be described in detail.

Note that since the sender and the destination coincide with each other, the data packet 600 and the packet 610 of error tolerance information may be contained in a single packet. Such a packet is denoted in FIG. 5 as an extended packet 620, for example. The data packet 600 and the packet 610 of error tolerance information are stored in the extended packet 620 so that they can be identified from each other.

A router 703a is provided between the system bus 10 and a local bus 11 for connecting the system bus 10 and the local bus 11 together. The local bus 11 is a peripheral bus, which is separately provided for each function, such as video or peripheral.

The communication device 701a obtains information of the bus operating frequency or the bus voltage from an adjacent router 703a, to grant a transmission error tolerance. The router 703a dynamically varies the bus operating frequency or the bus voltage by using DVFS (Dynamic Voltage and Frequency) units 704a and 704b, depending on the use case or the bus transmission load, thus conserving the bus power. The DVFS units 704a and 704b send information of the bus operating voltage and/or the bus operating frequency to the communication devices 701a and 701b, respectively. The communication devices 701a and 701b determines whether or not to grant an error tolerance based on the bus operating voltage and/or the bus operating frequency.

Note that as will be described later, it is not necessary to dynamically determine whether or not to apply error tolerance based on the voltage or the bus operating frequency. The application of the error tolerance may be fixedly determined at the time of design based on other conditions, such as the number of router relay stages, whether it is a communication within an SoC or between SoCs. In the present disclosure, a condition used for determining whether or not to grant an error tolerance is referred to as a "condition regarding the bus system operation environment".

Since the reliable communication devices 701a and 701b transmit data and error tolerance information separately in independent packets, only the packet 610 of error tolerance can be easily discarded at the communication device on the receiving side (the reliable communication device 701b in FIG. 5).

Utilizing the communication devices 701a and 701b of the present embodiment, it is possible to use existing routers. That is, it is possible to utilize existing resources, and to reduce the cost. By providing a communication device as a device independent of a router, etc., its functions can be more reusable and it becomes more general-purpose. Note however that it is possible to incorporate the configuration of a communication device into a router. Such an example will be illustrated later.

Figure 6:
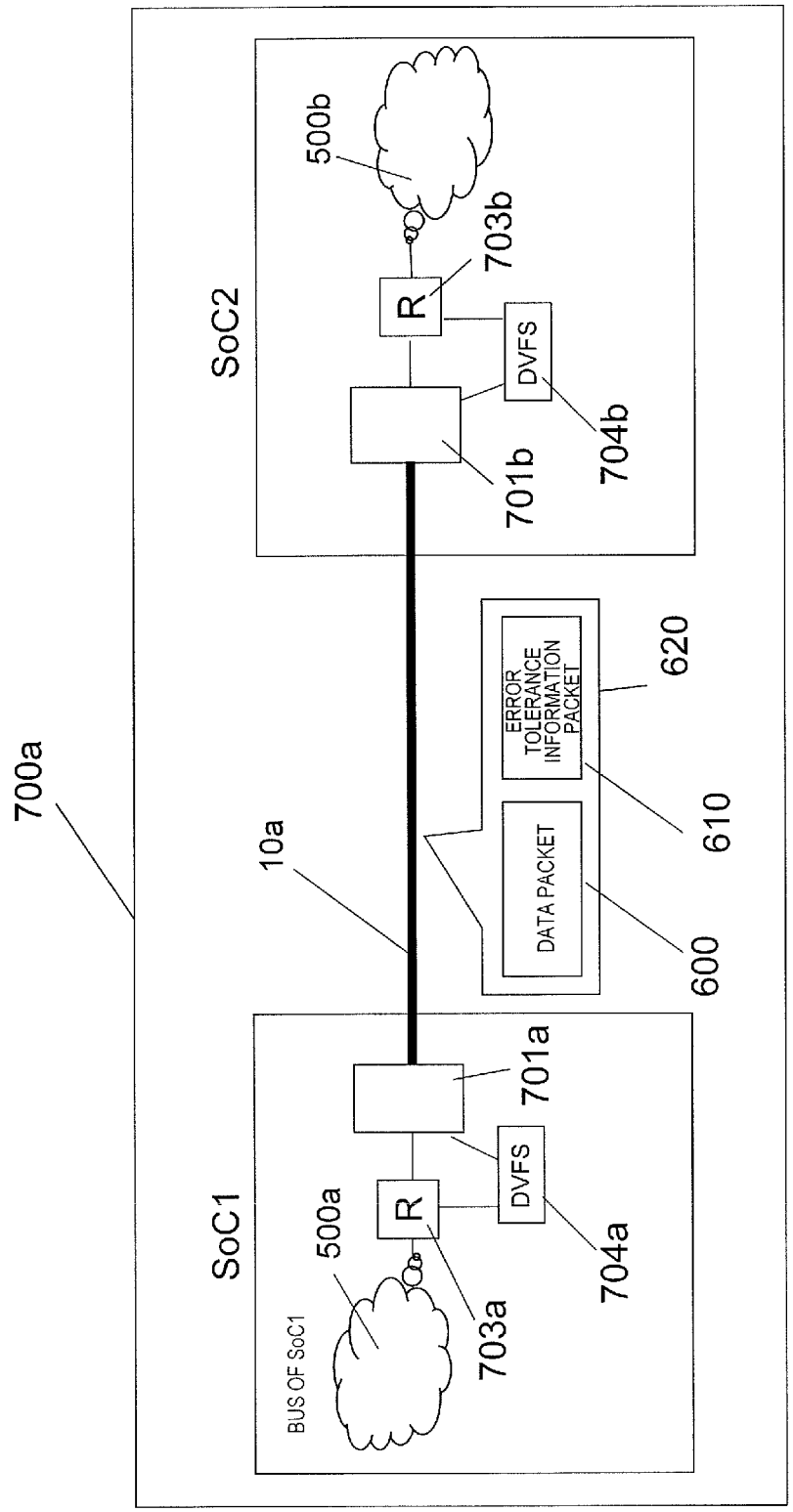
FIG. 6 shows an example where the bus system 700 shown in FIG. 5 is applied to a bus system (circuit board) 700a having a plurality of SoCs.

FIG. 6 shows an example where the bus system 700 shown in FIG. 5 is applied to a bus system (circuit board) 700a having a plurality of SoCs. The circuit board 700a has a bus system construct with SoC1, SoC2 and a bus 10a. The two SoCs (SoC1 and SoC2) are connected together by the bus 10a.

SoCs will now be described in detail. Note that as shown in FIG. 5, the present disclosure is applicable to applications not limited to SoCs. Nevertheless, a configuration of an SoC will be described in relation to an embodiment where a plurality of SoCs are connected together via a bus network.

<2. Configuration of SoC>

SoC1 and SoC2 shown in FIG. 6 have generally the same configuration. SoC1 will be described, for example. SoC1 includes the communication device 701a, the DVFS unit 704a, the router 703a, and a local bus 500a. Elements having like functions to those shown in FIG. 5 are denoted by like reference numerals. The communication device 701a, the DVFS unit 704a and the router 703a operate as described above in conjunction with FIG. 5. This also applies to the point that the data packet 600 and the packet 610 of error tolerance information are transferred.

Typically, communication between SoCs performed by utilizing the bus 10a (communication across the circuit board) is more susceptible to external influence and is more prone to transmission errors, as compared with a communication along a bus within an SoC. Therefore, the application of the present disclosure may be limited to communication between SoCs utilizing the bus 10a. Then, it is no longer necessary to modify all the routers inside each SoC, as compared with those of conventional techniques, and one can expect an improvement to the efficiency in developing SoCs.

Now, in order to describe the configuration of an SoC in greater detail, a specific configuration example of the local buses 500a and 500b included in SoC1 and SoC2, respectively, will be described. Following the description, the configuration and operation of the communication devices 701a and 701b will be described in detail.

The present embodiment is directed to an example where a plurality of bus masters (BM) as sending nodes and a plurality of memory devices as receiving nodes are configured by using a mesh network where a plurality of 2-input 2-output routers are connected in multiple stages via buses.

Figure 7:
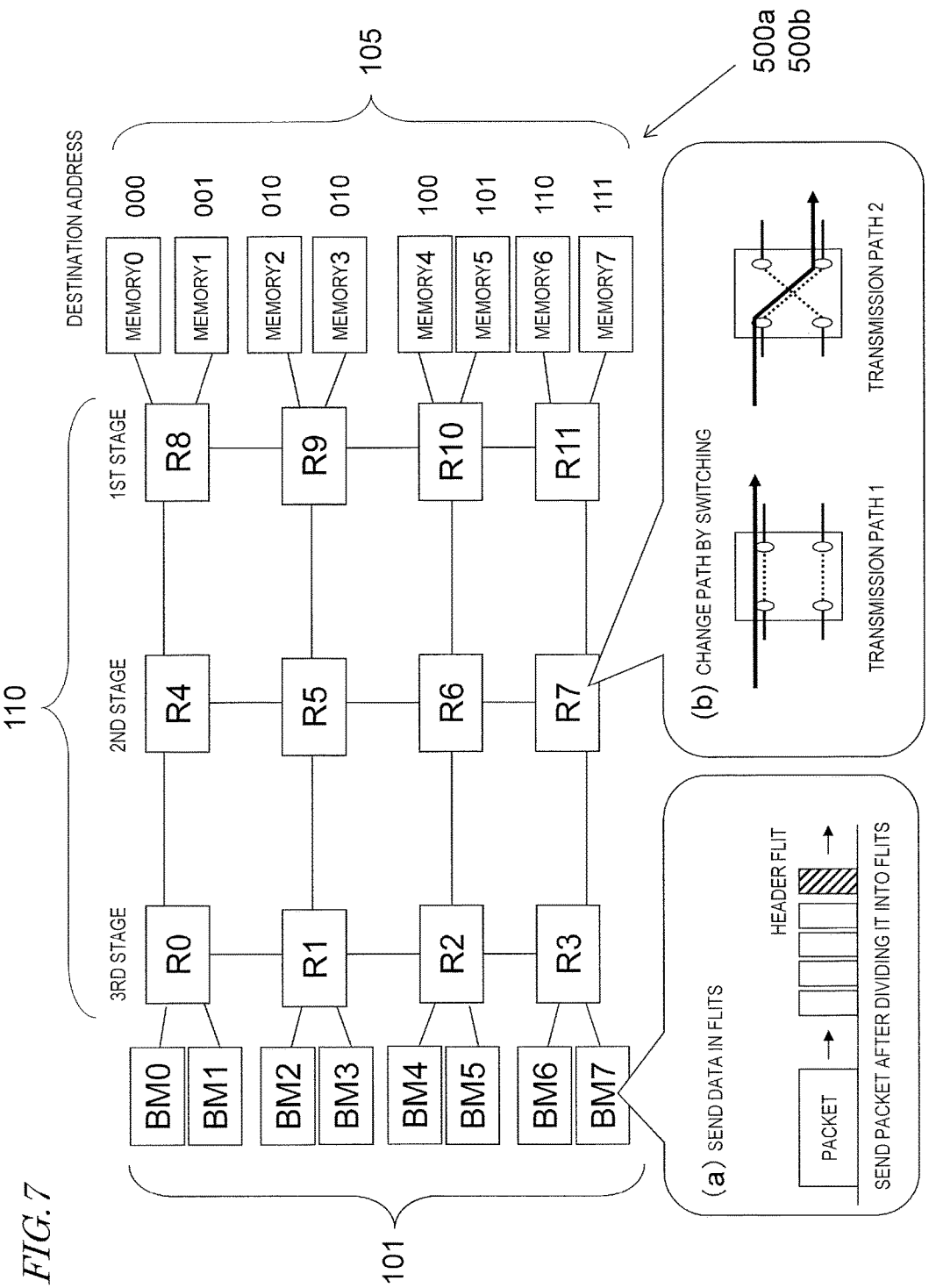
FIG. 7 shows an example of a bus system using local buses 500a and 500b of the present embodiment.

FIG. 7 shows an example of a bus system using the local buses 500a and 500b of the present embodiment. Note that the local buses 500a and 500b do not need to be completely identical to each other, and may be configured differently. The following description assumes that the local bus 500a has the configuration of FIG. 7.

The local bus 500a includes eight bus masters (BM) 101 as sending nodes, and eight memory devices 105 as receiving nodes. These bus masters 101 and these memory devices 105 are connected in multiple stages with buses via twelve routers 110. The network configuration shown in FIG. 7 is called a "mesh network".

Thus, the transmission system shown in FIG. 7 forms a multistage interconnection network (MIN). Note that the connection between an illustrated router R7, for example, and the router 703a of FIG. 6 enables transmission of data with other SoCs (SoC2 in the example of FIG. 6).

For example, the bus master 101 of the present embodiment is a device capable of performing a data transfer control using a bus, such as a processor or a DSP, for example. The memory device 105 is a semiconductor memory device such as a DRAM or an SRAM, for example. Note that in the embodiment of the present disclosure, the memory devices 105 can be configured by connecting nodes other than memory devices, such as processors, DSPs and I/Os. A router 500 is a semiconductor circuit, for example, and has a function of relaying data transmitted between a plurality of bus masters 101 and a plurality of memory devices 105.

Data transmission from the bus master 101 to the memory device 105 is performed by a packet switching scheme. As shown in FIG. 7(a), each bus master divides a packet to be sent into the minimum unit called "flits", and then sends the flits to adjacent routers. Of a plurality of flits into which one packet is divided, the flit to be sent first is called the "header flit". The header flit describes flag information indicating that it is the top of the packet, the address information of the destination of the packet, etc. The data structure of packets and flits of the present embodiment will be later described in detail. Note that a "packet" as used herein corresponds to the data packet 600 referred to in FIG. 5 and FIG. 6.

The routers of the multistage interconnection network shown in FIG. 7 each include a 2-input 2-output crossbar switch. Each router can change the input/output pairing by switching the crossbar switch as shown in FIG. 7(b). Therefore, the traffic flow can be switched between two transmission paths (transmission paths 1 and 2). If there are different destination transmission paths, a router can simultaneously output two traffic flows to the transmission paths. With such a multistage interconnection network, it is always possible to construct one or more transmission path between all bus masters and all memory devices by switching the switch at each router.

In a mesh network, it is possible to use a communication scheme whereby one can attempt to widen the bandwidth by allowing one sending node to use a plurality of transmission paths as necessary while sharing a transmission path between a plurality of sending nodes. Note that although the present embodiment is directed to a mesh network example, it is merely an example. The present disclosure is also applicable even if the configuration of the integrated circuit has a different topology (e.g., a butterfly network).

Next, a packet and flit structure of the present embodiment will be described. Note that although the present embodiment is directed to an example where packets or flits are used, using packets for transmission is merely a matter of design choice. Packets or flits can be generalized to be referred to simply as "data".

Figure 8:
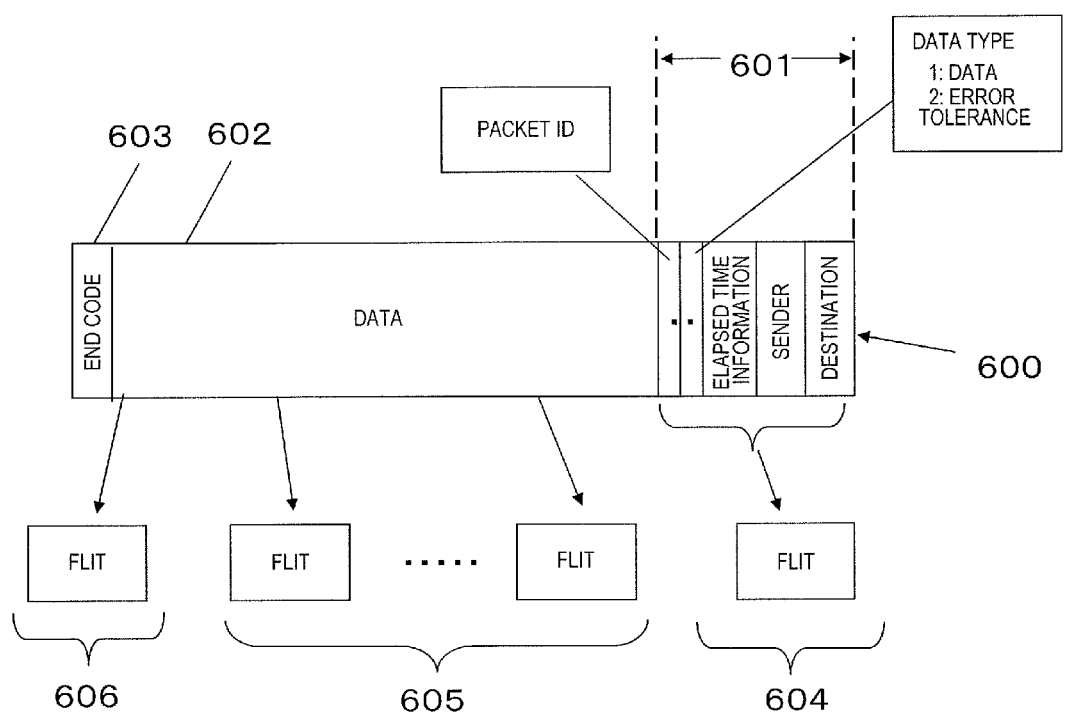
FIG. 8 shows an example transmission format of a packet 600, and an example where the packet 600 is divided into a plurality of flits.

FIG. 8 shows an example transmission format of the packet 600, and an example where the packet 600 is divided into a plurality of flits. The packet 600 includes a header field 601, a data field 602, and a control code field 603.

For example, the header field 601 describes the destination address, the sender address, information representing the amount of time elapsed since the packet was sent (elapsed time information), and information representing the type of the packet. How the elapsed time is described is arbitrary, and it may be any method of description as long as it is possible to identify, based on the value, the amount of time elapsed since the sending. For example, the time of sending may be described directly, or it may be the amount of time elapsed since the sending, the number of routers that have been passed up to the current moment (the hop count), etc. Each time a router relays the packet 600, the router may increment the hop count, or may decrement the hop count which has initially been set to a predetermined maximum hop count.

The information representing the type of the data indicates whether the packet is a normal packet 600, or a packet 610 storing error tolerance information.

For example, if data output from a bus master is a packet storing data therein, the bus master assigns "1" to the packet. If it is error tolerance information, "2" is assigned. Thus, by distinguishing between different types of data by the unit of packets, it is possible to simply add or discard error tolerance information during the error tolerance process. This will be described in detail in conjunction with the sequence diagram of FIG. 14.

Note that the above values indicating types of packets are merely illustrative. Any specific values may be used as long as the different types can be identified. Instead of having bus masters generate packets, a network interface controller (NIC) may be provided between the bus masters and the routers 110 so that the NIC generates packets.

The header field 601 is further provided with the packet ID. The packet ID normally assigns a different value to each packet. In the present embodiment, however, the same packet ID is assigned to the packet 600 of data and to the packet 610 storing error tolerance information for correcting an error occurring in that data. Therefore, the communication device on the receiving side can identify the correlation between data and error tolerance information.

The header field 601 may describe information other than those described above. The process of relaying the packet 600 and the process of receiving the packet 600 on the receiving side are performed based on the destination address and the sender address, among other data in the header field 601.

The data field 602 describes, for example, video data and sound data. The control code field 603 describes, for example, a predetermined end code of the packet 600. A router can determine the end of the packet 600 by detecting the end code. The control code field 603 may store information other than the end code.

The bus masters 101 on the sending side transmits the packet 600 after dividing it into small packets called "flits". One flit is an amount of data that can be transmitted over one cycle using a bus, and the size of one flit is determined based on the size of the bus width.

The packet 600 is divided into a header flit 604, a plurality of data flits 605, and a tail flit 606.

The first flit to be sent, of the flits into which the packet 600 has been divided, is called the header flit 604. The header flit 604 includes flag information indicating that it is the start of the packet, flag information stored in the header field 601 of the packet 600 described above, and destination address information, etc.

Flits following the header flit 604 (the data flit 605 and the tail flit 606) do not store the address information for identifying the destination. That is because flits following the header flit 604 are sent to the same destination as the header flit 604. Once the destination is determined by the header flit 604, and the output buffer of the router to which flits of the traffic flow are to be output is determined, the following flits are transmitted to the destination indicated by the header flit 604 by utilizing the same output buffer as the header flit 604.

The tail flit 606 is assigned flag information (the end code stored in the control code field 603) indicating that the flit is the last flit of the packet. The plurality of flits 605 other than the header flit 604 and the tail flit 606 are flits (data flits) for primarily transmitting data, and they correspond to the data field 602 of the packet 600.

Detecting the flag information (end code) described in the tail flit 606, the memory device 105 on the receiving side reconstructs a packet from the plurality of flits transmitted thereto based on the end code.

For example, the size of one packet is 128 bytes, whereas the size of one flit is 32 bits or 64 bits. Note however that the size of one packet and the size of one flit may differ from an application to another, and that the sizes described above are merely illustrative. The length of the flit may be determined such that control data such as the destination address or the sender address can be described therein.

As will be described later, each router includes a buffer storing a flit that has been sent thereto. After being once stored in the buffer, the flit is sent to a router connected to the destination memory device or to the destination memory device depending on the position of the switch.

<2.1. Configuration and Operation of Router>

Figure 9:
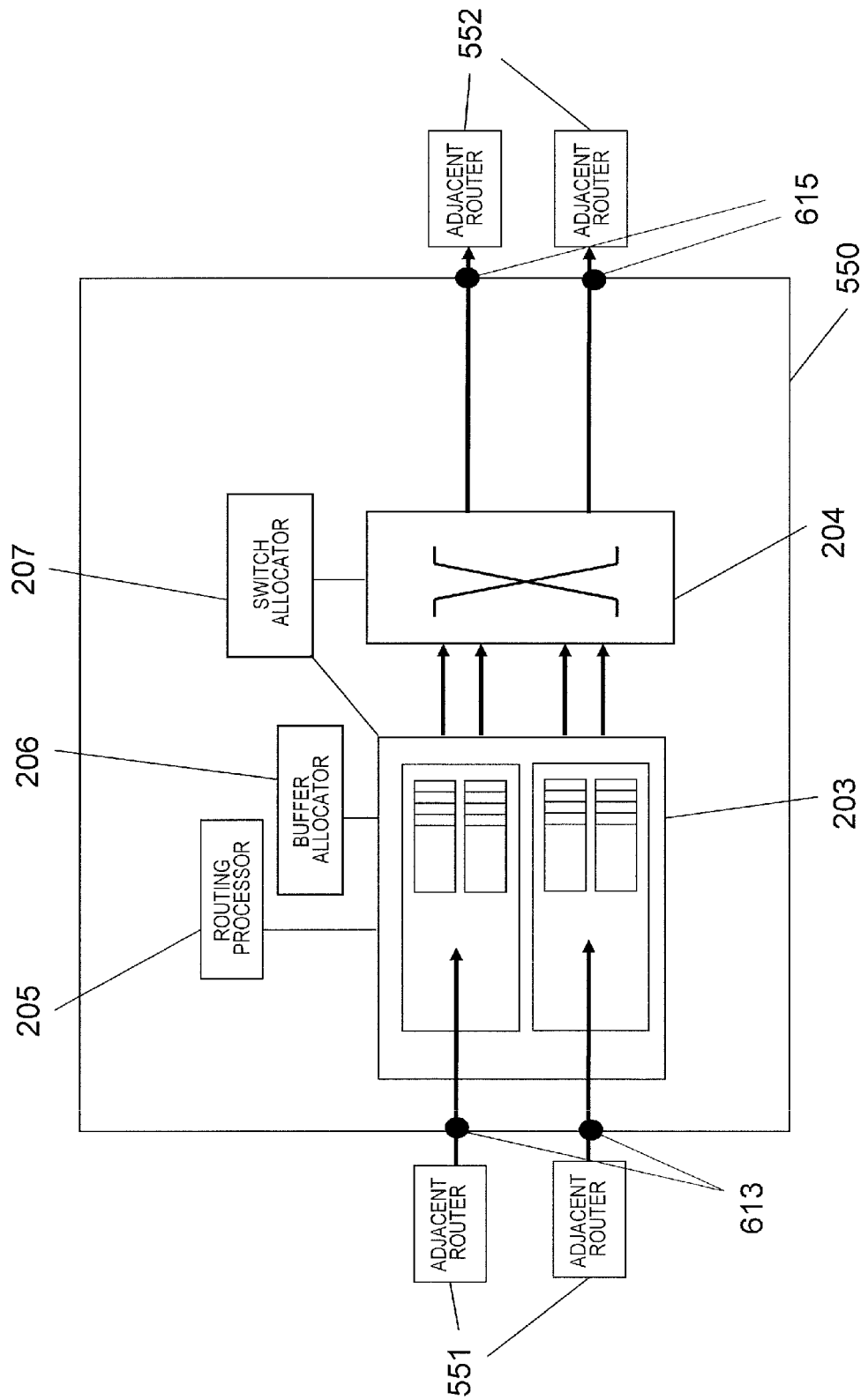
FIG. 9 shows a configuration of a router 550.
Figure 10:
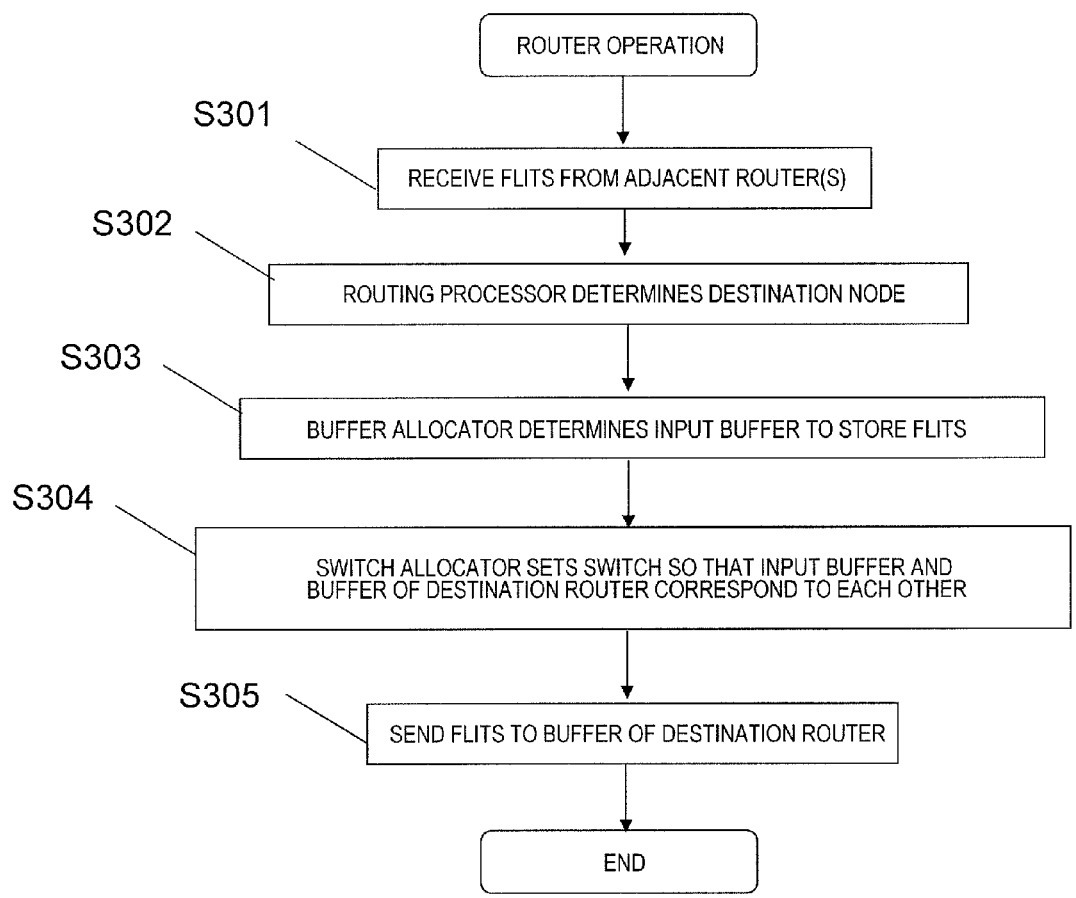
FIG. 10 shows a flow chart showing an operation procedure of a router 550.

FIG. 9 shows a configuration of the router 550. FIG. 10 is a flow chart showing an operation procedure of the router 550.

The router 550 includes a plurality of input ports 613 and output ports 615. It receives flits from (a group of) preceding routers 551 through the input ports 613, and sends out the flits to (a group of) subsequent routers 552 through the output ports 615.

The router 550 includes an input buffer 203, a switch 204, a routing processor 205, a buffer allocator 206, and a switch allocator 207. The function and operation of each component of the router 550 will now be described while describing the steps of FIG. 10.

First, the router 550 receives flits from (a group of) adjacent routers 551 at the input ports 613, and stores the received flits in the input buffer 203 (S301). The routing processor 205 determines the destination node to which the flits are transferred (S302). Next, the buffer allocator 206 determines the input buffer of (a group of) adjacent subsequent routers 552 in which the flits are to be stored (S303). The switch allocator 207 sets the switch so that the input buffer 203 and the input buffer 203 of the destination router correspond to each other (S304). As the switch allocator 207 connects the switch, the flits are sent to the buffer of the destination router 552 through the output ports 615 (S305).

Note that the (groups of) adjacent routers 551 and 552 of FIG. 9 may be replaced by bus masters and/or memory devices, respectively.

<2.2. Configuration and Operation of Reliable Transmission Device>

Figures 11, 12:
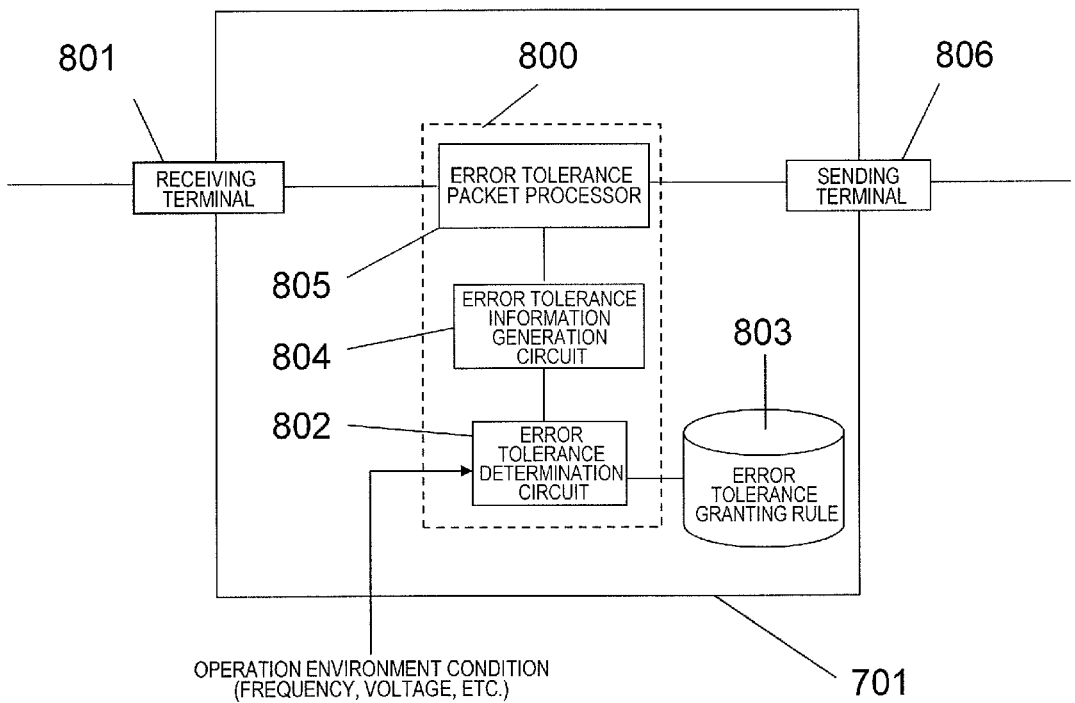
FIG. 11 shows a configuration of a reliable communication device 701.
FIG. 12 shows an example rule stored in a storage device 803.

FIG. 11 shows a configuration of a communication device 701.

The communication device 701 includes an arithmetic circuit 800, a receiving terminal 801, a storage device 803, and a sending terminal 806.

First, the receiving terminal 801 receives data from an external network element such as an adjacent router, for example.

The storage device 803 stores a rule in which conditions regarding the bus system operation environment and error tolerance schemes are associated with each other. The storage device 803 is, for example, a ROM, a RAM, a solid state drive (SSD). The storage device 803 may be configured to be able to read data from a removable storage medium. Collectively, the storage device may be referred to as a "storage section".

FIG. 12 shows an example rule stored in the storage device 803.

This rule defines error tolerance schemes for different bus voltages, bus operating frequencies, numbers of relay stages, and modes of connection. In the present embodiment, three error tolerance schemes of CRC, parity, and none are used. Note that CRC provides a higher level of error tolerance than parity.

The present inventors determined the rule shown in FIG. 12 using the following criteria. First, an error tolerance is applied as the line width and the voltage are reduced or the line length is increased, in which case transmission errors are more likely to occur. For the bus operating frequency, an error tolerance is applied as the bus operating frequency is increased, in which case transmission errors are more likely to occur. Typically, as the number of relay stages is increased, the bus length increases, and transmission errors are therefore more likely to occur. Therefore, an error tolerance is applied for packets to be transmitted over a bus with a large number of relay stages. Whether the bus is one within an SoC or one between SoCs is also taken into consideration. For example, for a bus within an SoC, transmission errors are unlikely to occur because such a bus is insusceptible to external disturbances. Therefore, no error tolerance is applied on the assumption that no transmission error will occur. On the other hand, for packets to be transmitted over the bus 10a between SoCs as shown in FIG. 6, a transmission error tolerance is applied because such packets are susceptible to external factors. Where the error tolerance is weighted due to the application of a plurality of criteria, a higher level of error tolerance can be applied.

For example, in the example of FIG. 12, where the bus voltage is low (3 V), an error tolerance scheme of a higher level of tolerance is applied, i.e., "resend packet in addition to CRC". This is because it is believed that the chance of transmission errors increases in such a case. Transmission between SoCs is even more susceptible to external factors, and it is believed that the chance of transmission errors further increases. Therefore, in the present embodiment, a packet is resent when the packet is undelivered, in addition to CRC.

Where the bus voltage is high (5 V) and the bus operating frequency is low (150 MHz), no error tolerance is granted. This is because a stable operation can be expected. Even where the bus voltage is 5 V, if the bus operating frequency is 200 MHz and the number of relay stages is high, an error tolerance is granted, although an error tolerance process of a lower level of tolerance is performed.

As described above, the level of the transmission error tolerance can be determined based on various factors. Note that more specific levels of transmission error tolerance can be determined based on an evaluation through a simulation or by using an actual system.

Reference is again made to FIG. 11.

The arithmetic circuit 800 determines an error tolerance scheme based on the condition regarding the bus system operation environment, referring to the rule stored in the storage device 803, and generates error tolerance information corresponding to data received by the receiving terminal 801 according to the determined error tolerance scheme.

The sending terminal 806 sends a packet of error tolerance information and a data packet to the bus.

The configuration and operation of the arithmetic circuit 800 will now be described in greater detail.

The arithmetic circuit 800 includes an error tolerance determination circuit 802, an error tolerance information generation circuit 804, and the error tolerance packet processor 805. Note that in the following description, the error tolerance determination circuit will be referred to as a "determination circuit", the error tolerance information generation circuit as an "information generation circuit", and the error tolerance packet processor as a packet processor.

The determination circuit 802 determines an error tolerance scheme based on the condition regarding the bus system operation environment. As described above, this condition includes conditions such as the bus operating voltage, the bus operating frequency, number of router relay stages, whether it is a communication within an SoC or between SoCs. This condition can be said to be a condition that influences the occurrence of transmission errors.

The information generation circuit 804 generates error tolerance information for data to be transferred based on the determined error tolerance scheme.

The present inventors assume that the arithmetic circuit 800 described above is a piece of hardware (e.g., a dedicated processor) that implements the various components described above, i.e., the determination circuit 802, the information generation circuit 804 and the packet processor 805. However, the arithmetic circuit 800 may be implemented as a combination of a general-purpose computer (processor), and a computer program code for realizing processes corresponding to the various components described above. As a collective term, the arithmetic circuit may be called an "error processor", or "error processing circuit".

Note that FIG. 11 primarily shows a configuration corresponding to the communication device 701a on the sending side (FIG. 6). This configuration, however, can be utilized as a configuration of the communication device 701b on the receiving side (FIG. 6). In such a case, the packet processor 805 can divide the data packet 600 and the packet 610 of error tolerance information received by the receiving terminal 801 into the data packet 600 and the packet 610 of error tolerance information and perform an error tolerance process on the data packet 600 by utilizing the error tolerance information in the obtained packet 610. Then, the packet processor 805 can send the data packet 600 having undergone the error tolerance process through the sending terminal 806 and the bus.

Figure 13:
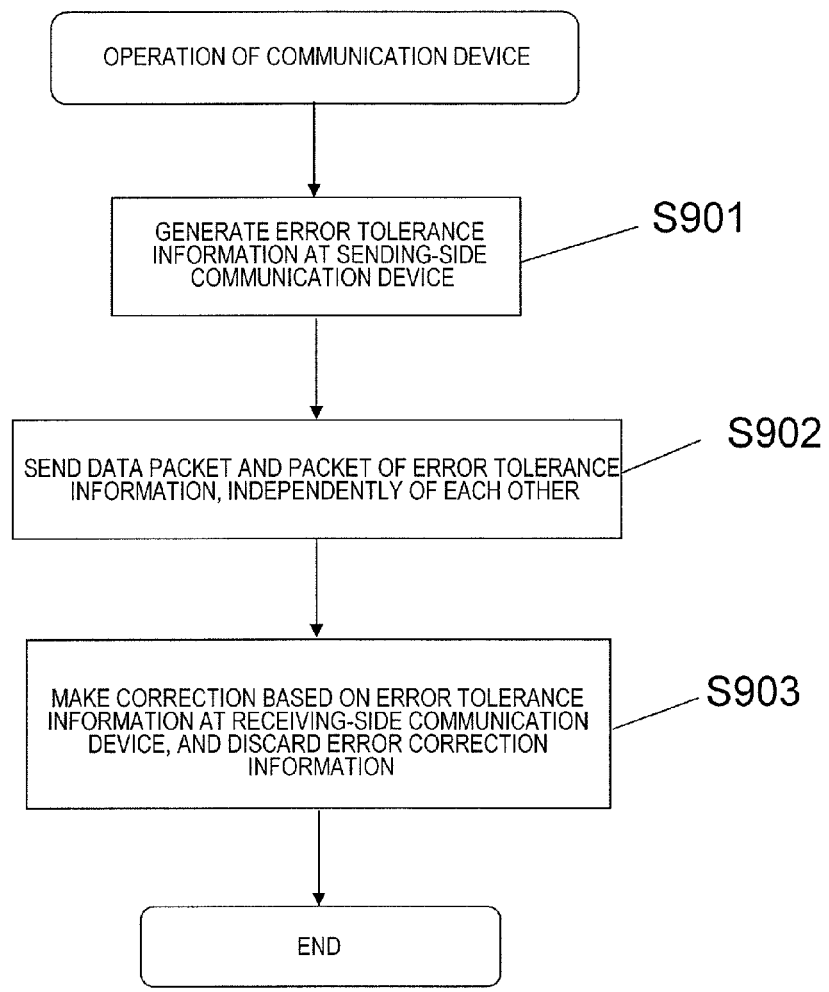
FIG. 13 shows a flow chart showing a schematic operation procedure of a reliable communication device.

FIG. 13 is a flow chart showing a schematic operation procedure of a communication device.

The information generation circuit 804 of the sending-side communication device 701a (FIG. 6) generates error tolerance information (S901). The packet processor 805 send the data packet 600 and the packet 610 of error tolerance information, each as an independent packet, from the sending terminal 806 (S902). The receiving-side communication device 701b (FIG. 6) corrects data based on the error tolerance information, and discards the error correction information (S903).

Figure 14:
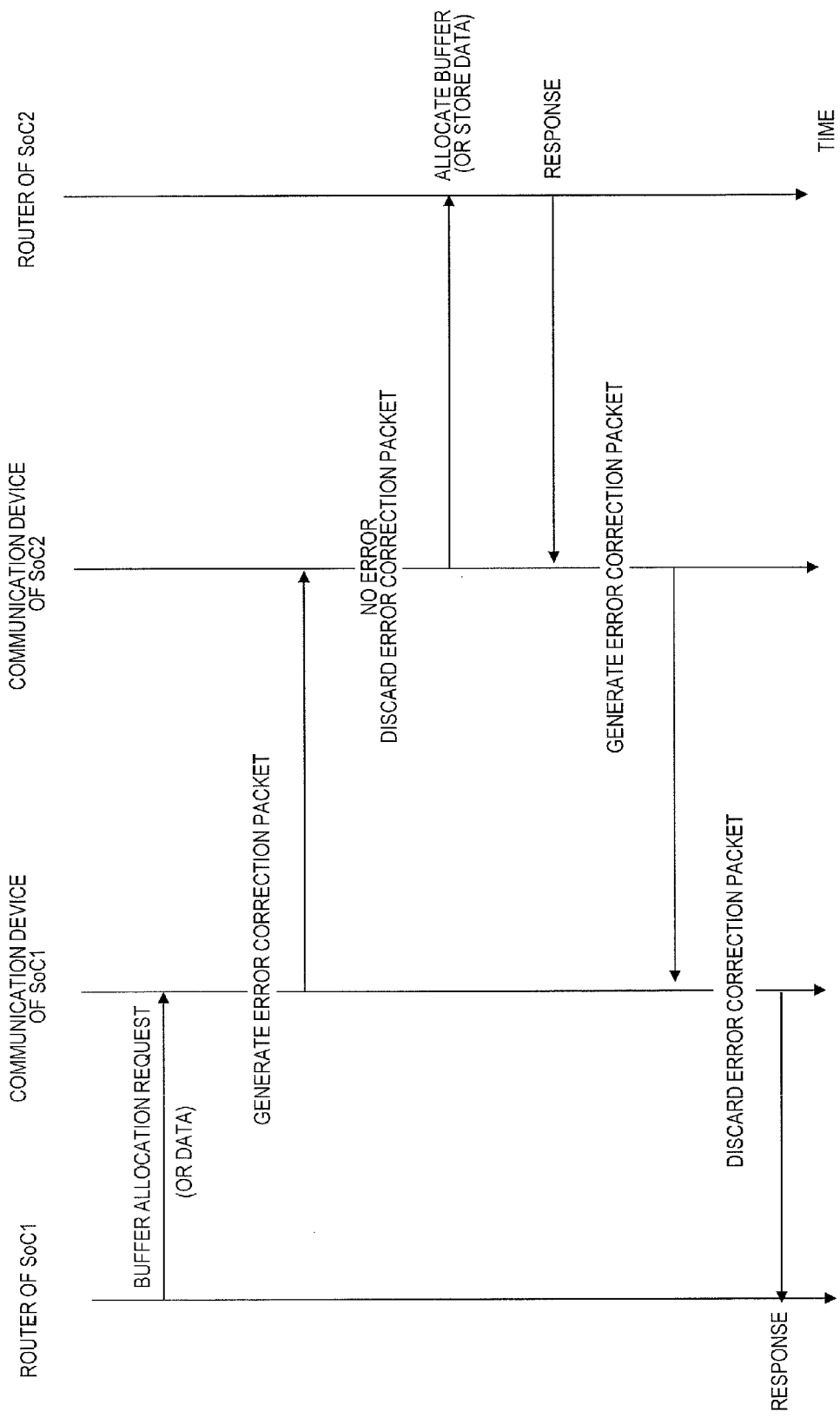
FIG. 14 shows an example sequence where no transmission error occurs.

FIG. 14 shows an example sequence where no transmission error occurs. Here, it will be described, assuming that the bus system of FIG. 6 is used.

In the illustrated example, in order to transmit data from the router 703a of SoC1 to a router 703b of SoC2, the router 703a of SoC1 issues a request to reserve a buffer of the router 703b of SoC2. In response to the reservation request packet, the communication device 701a of SoC1 generates a packet of error tolerance information. The reservation request packet corresponding to the data packet 600 and the packet 610 of error tolerance information associated with this packet are transmitted independently of each other. The communication device 701b of SoC2 detects a transmission error of the reservation request packet based on the error tolerance information of the packet 610. If there is no problem, the communication device 701*b* discards the packet 610 of error tolerance information, and transmits the reservation request packet to the router 703*b* of SoC2. The router 703*b* of SoC2 reserves a buffer of itself based on the reservation request, and a response to the reservation is transmitted to the communication device 701*b* of SoC2.

The communication device 701*b* of SoC2 generates a response packet corresponding to the data packet 600, and the packet 610 of error tolerance information associated with this packet. The response packet and the packet of error tolerance information associated therewith are transmitted independently of each other. The communication device 701*a* of SoC1 detects a transmission error of the response packet based on the error tolerance information of the packet 610. If there is no problem, the packet 610 of error tolerance information is discarded, and the response packet is transmitted to the router 703*a* of SoC1. After the router 703*a* of SoC1 reserves a buffer of the router 703*b* of SoC2, data is transmitted through a similar procedure to the reserved buffer.

Figure 15:
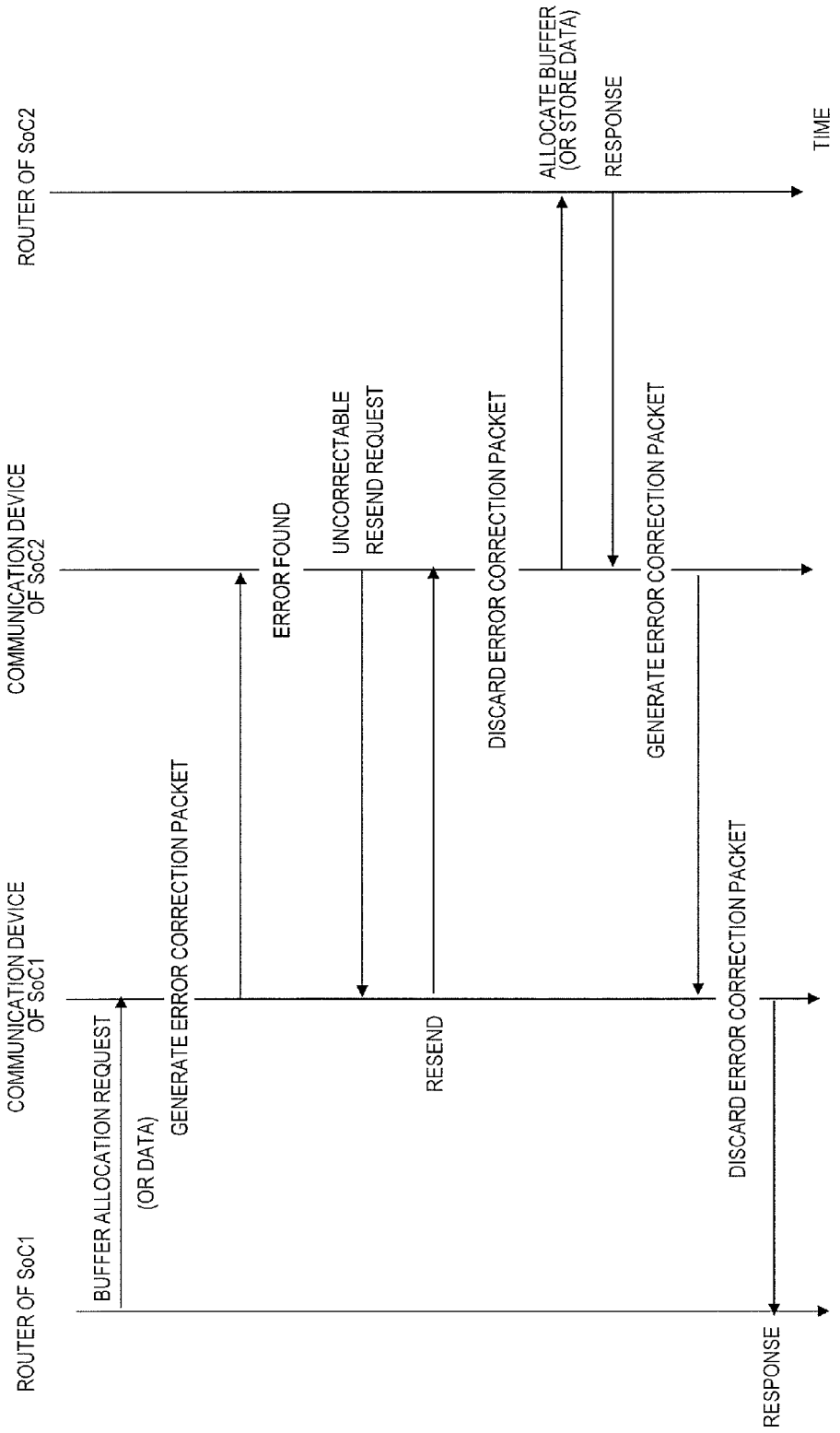
FIG. 15 shows an example sequence where a transmission error occurs.

FIG. 15 shows an example sequence where a transmission error occurs. It will also be described, assuming that the bus system is used.

In the illustrated example, in order to transmit data from the router 703*a* of SoC1 to the router 703*b* of SoC2, the router 703*a* of SoC1 issues a request to reserve a buffer of the router 703*b* of SoC2. In response to the reservation request packet, the communication device 701*a* of SoC1 generates a packet of error tolerance information. The reservation request packet corresponding to the data packet 600 and the packet 610 of error tolerance information associated with this packet are transmitted independently of: Each other. The communication device 701*b* of SoC2 detects a transmission error of the reservation request packet based on the error tolerance information of the packet 610.

Where an error is detected and the error can be corrected, the communication device 701*b* of SoC2 corrects the error. Where the error cannot be corrected, the communication device 701*a* of SoC1, which is the sender, is requested to resend the reservation request packet. If the problem is solved through this procedure, the packet 610 of error tolerance information is discarded, and the reservation request packet is transmitted to the router 703*b* of SoC2. The router 703*b* of SoC2 reserves the router buffer based on the reservation request, and transmits a response to the reservation to the communication device 701*b* of SoC2.

The communication device 701*b* of SoC2 generates a response packet corresponding to the data packet 600, and the packet 610 of error tolerance information associated with this packet. The response packet and the packet of error tolerance information associated therewith are transmitted independently of each other. The communication device 701*a* of SoC1 detects a transmission error of the response packet based on the error tolerance information of the packet 610. If there is no problem, the packet 610 of error tolerance information is discarded, and the response packet is transmitted to the router 703*a* of SoC1. After the router 703*a* of SoC1 reserves a buffer of the router 703*b* of SoC2, data is transmitted through a similar procedure to the reserved buffer.

Figure 16:
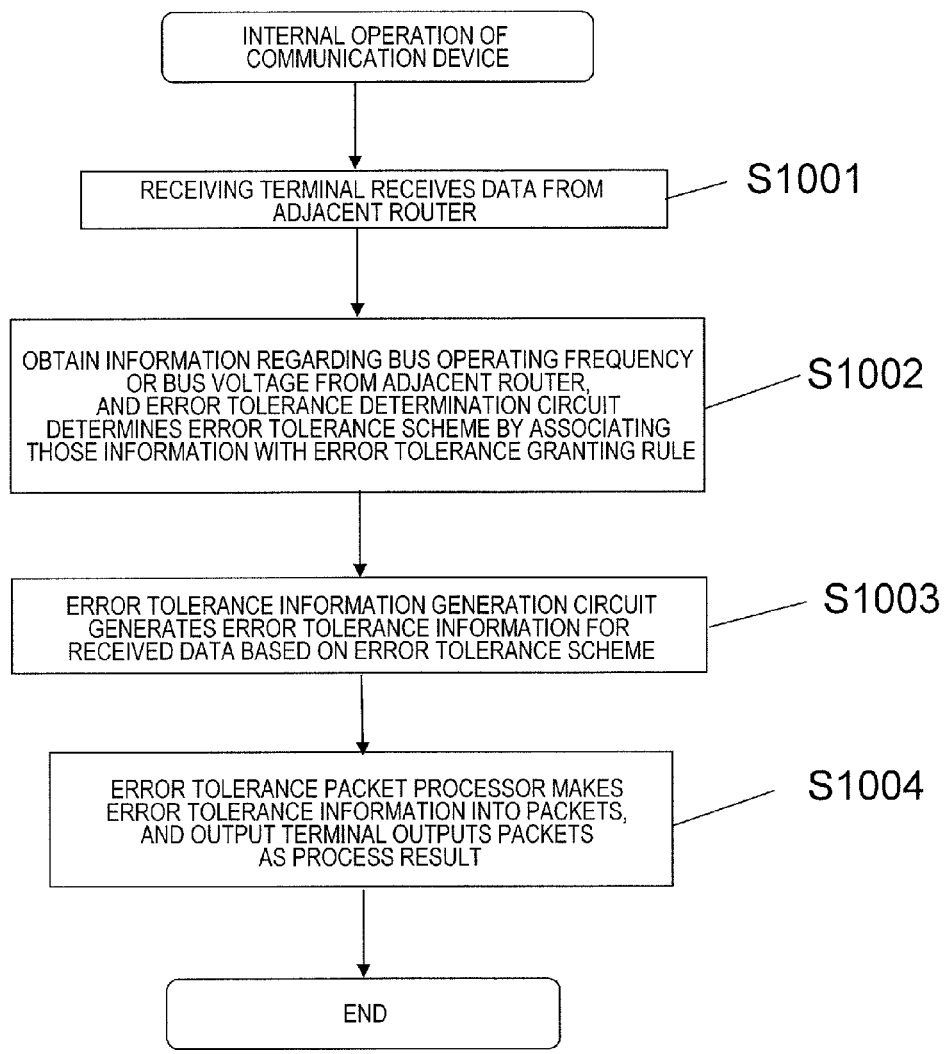
FIG. 16 shows a flow chart showing a detailed internal operation of a reliable communication device.

FIG. 16 is a flow chart showing a detailed internal operation of the communication device.

The receiving terminal 801 receives data from an adjacent router (S1001). The determination circuit 802 obtains information of the operation environment-related condition from an adjacent router or the DVFS unit 704*a*, and determines an error tolerance scheme by associating those information with the error tolerance granting rule (S1002). The information generation circuit 804 generates error tolerance information corresponding to the received data based on the determined error tolerance scheme (S1003). The packet processor 805 turns the generated error tolerance information into packets, and outputs the packets as the process result (the packet 610) from the sending terminal 806 (S1004).

Figure 17:
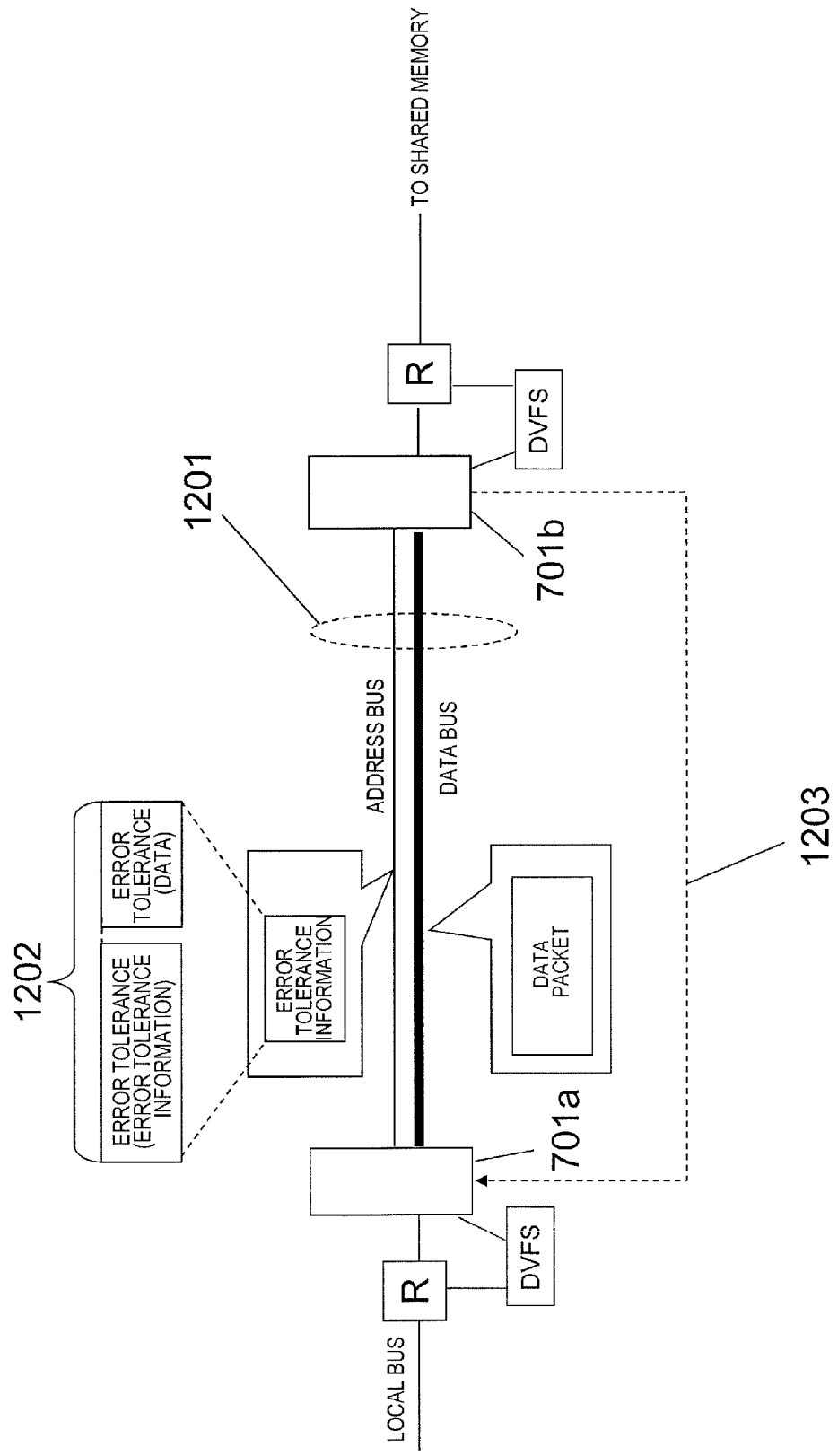
FIG. 17 shows a plurality of examples relating to a method for transmitting error information separately from data.

FIG. 17 is a diagram illustrating a plurality of examples relating to a method for transmitting error information separately from data.

In the illustrated example, a system bus 12*a* is divided into a data bus and an address bus. Then, the packet 610 of error tolerance-related information is transmitted over the address bus, and the data packet 600 is transmitted over the data bus. Then, the error tolerance information and the data can be easily separated from each other. Error tolerance information may be further generated for the error tolerance information for the data, and data 1202 storing the two different error tolerance information may be transmitted. Then, an even higher level of transmission error tolerance is enabled. Moreover, a process 1203 may be performed, in which the error rate is measured by the communication device 701*b* on the receiving side, and the error tolerance scheme is changed by the communication device 701*a* on the sending side. Then, it is possible to increase the level of error tolerance following changes in the state of transmission errors.

<3. Variations>

Figure 18:
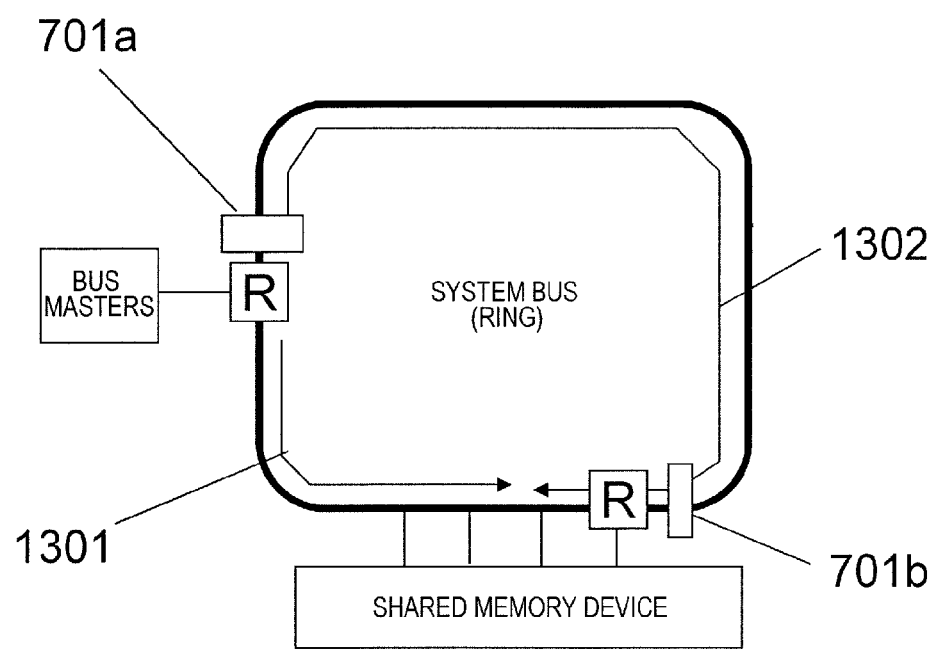
FIG. 18 shows an example where an error tolerance is applied to a case where a ring bus is used.

FIG. 18 shows an example where an error tolerance is applied to a case where a ring bus is used.

FIG. 18 shows an example in which access is made from one bus master to a shared memory device via a ring bus. Where the transmission distance from the bus master is short, the packet is transmitted over a transmission path 1301 with no error tolerance. Where the transmission distance from the bus master is long, the packet is transmitted over a path 1302 with an error tolerance. Therefore, as shown in the figure, a pair of communication devices described above are provided at opposite ends of the transmission path utilizing the path 1302 which is a long line.

Typically, traffic flows for a transmission path with a longer transmission distance are those with longer acceptable delay time and lower priority. Therefore, it is easier to hide the overhead deriving from granting an error tolerance to traffic flows with long acceptable delay time.

Note that the path length of a path of a ring bus is determined at the time of design. That is, when sending a packet from one router to another router, a path with a longer path length and a path with a shorter path length are determined at the time of design. Therefore, where to provide communication device described above may also be determined at the time of design.

In the description above, the communication device is described as being a different component than a router. However, it is possible to provide a router with the function of the communication device incorporated therein.

Figure 19:
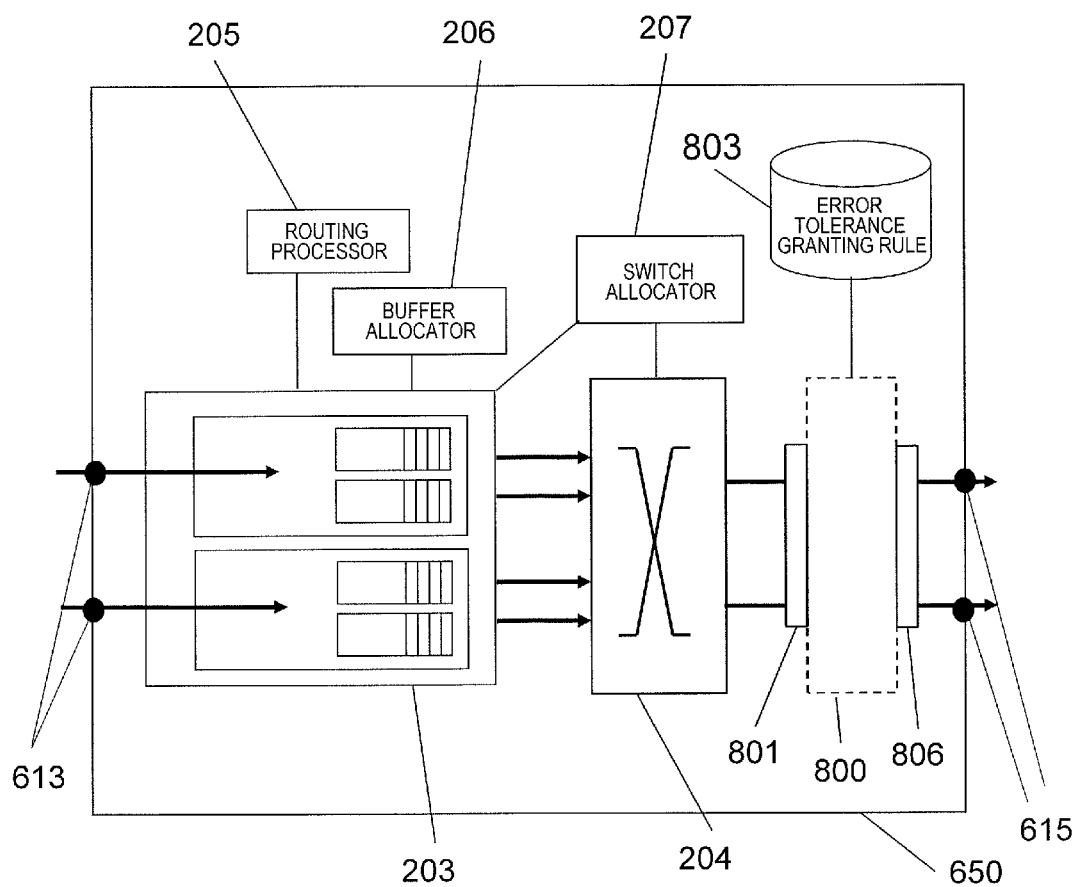
FIG. 19 shows a configuration of a router 650 with the function of the reliable communication device incorporated therein.

FIG. 19 shows a configuration of a router 650 with the function of the communication device incorporated therein. A difference from the router 550 shown in FIG. 9 is that all the components of the communication device 701 (FIG. 11) are provided between the switch 204 and the output port 615. A pair of such routers 650 may be provided at opposite ends of a bus requiring an error tolerance, whereas a pair of existing routers 550 are provided at opposite ends of a bus not especially requiring an error tolerance.

Figure 20:
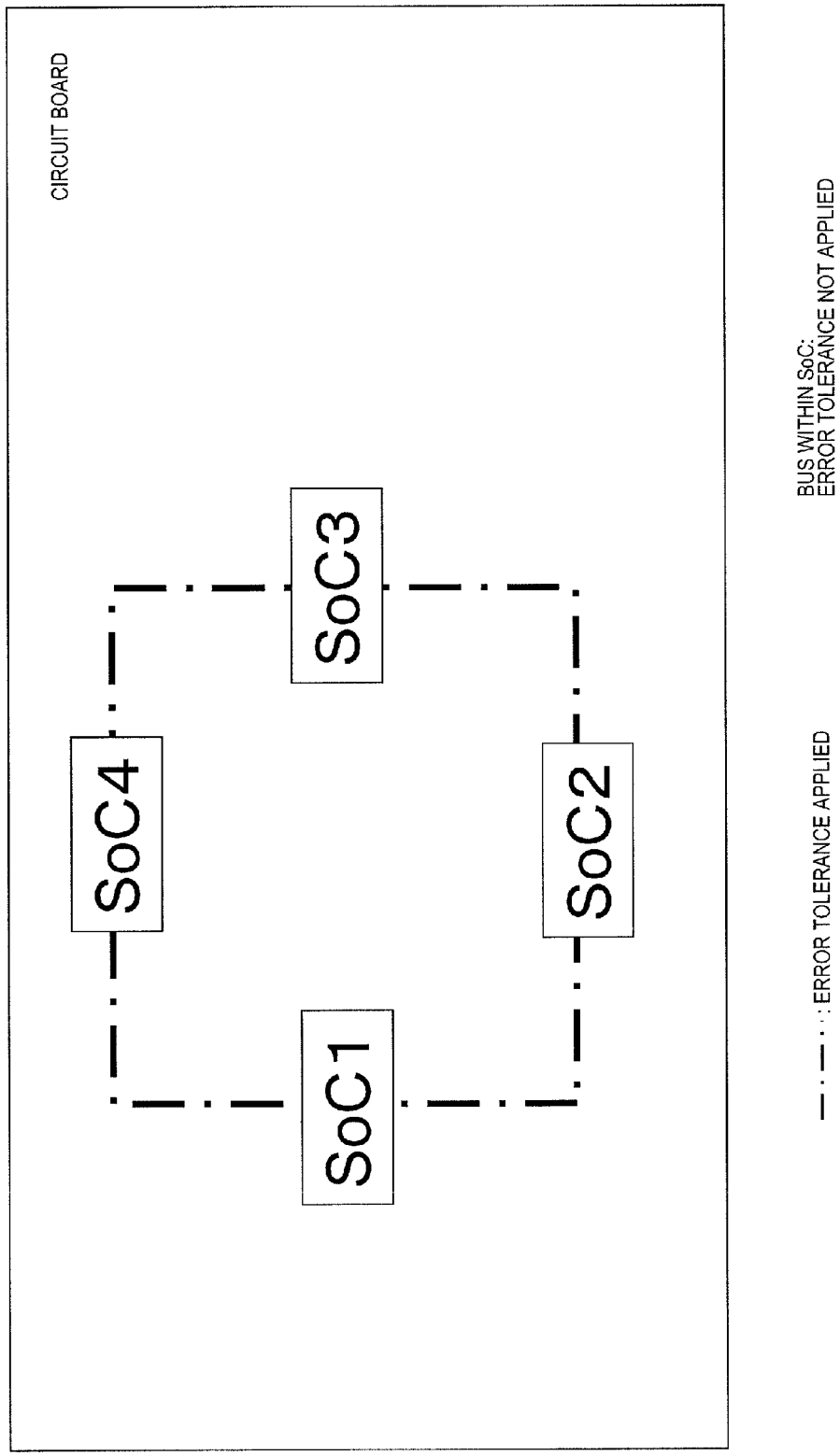
FIG. 20 shows an example where an error tolerance is applied to communication between SoCs on a circuit board.

FIG. 20 shows an example where an error tolerance is applied to communication between SoCs on a circuit board. Also in this example, as in the example of FIG. 6, an error tolerance process is not applied to a packet to be transmitted over a bus within an SoC, whereas an error tolerance process is applied to a packet to be transmitted over a bus between SoCs.

Note that each SoC illustrated herein may be a processor by itself, or a semiconductor system including a plurality of components such as a processor, a DSP, an I/O, etc. It does not need to be a semiconductor system where all components within an SoC are connected together by routers. For example, it may be a semiconductor system in which some components are provided by crossbar switches. According to the present disclosure, it is no longer necessary to modify all the routers of each SoC, as compared with conventional techniques, and one can expect an improvement to the efficiency in developing SoCs.

A reliable communication device of the present disclosure can be utilized for data transmission on a system LSI.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A communication device for use in a bus system of a semiconductor circuit having a sending node and a receiving node and including a bus over which data is transmitted by a packet switching scheme, the communication device comprising:
    a receiving terminal which receives one or more packets via a bus;
    a storage device which stores a rule in which a plurality of conditions regarding a bus system operation environment and a plurality of error tolerance schemes are respectively associated with each other, and information regarding a path length;
    an error processor which determines one error tolerance scheme from among the plurality of error tolerance schemes by referring to the rule based on a given one of the conditions regarding the bus system operation environment so as to generate error tolerance information corresponding to received data according to the determined error tolerance scheme; and
    a sending terminal which sends at least one packet including the error tolerance information and the data to the bus,
    wherein the plurality of conditions regarding the bus system operation environment are conditions for granting an error tolerance for a transmission path of which a path length of the bus to another communication device, which is a destination of the data, is greater than a predetermined value, and are conditions for granting an error tolerance in relation to:
    a frequency of the bus;
    an operating voltage of the bus;
    a path length of the bus to the other communication device; and
    an error rate received from the other communication device.

2. The communication device of claim 1, wherein the error processor receives the given condition from another device provided in the bus system.

3. The communication device of claim 1, wherein:
    the error processor generates a packet of the data and a packet of the error tolerance information; and
    the sending terminal sends the packet of the data and the packet of the error tolerance information independently of each other.

4. The communication device of claim 1, wherein:
    the error processor generates an extended packet including a packet of the data and the error tolerance information; and
    the sending terminal sends the extended packet.

5. The communication device of claim 1, wherein:
    where the error tolerance information is first error tolerance information;
    the error processor determines the error tolerance scheme by referring to the rule based on the given one of the conditions regarding the bus system operation environment so as to further generate second error tolerance information for correcting an error occurring while transmitting the first error tolerance information; and
    the sending terminal sends at least one packet including the first error tolerance information, the second error tolerance information and the data to the bus.

6. The communication device of claim 1, wherein:
    the bus includes a data bus to transmit one or more packets of the data, and an address bus to transmit address information indicating a destination of the packet; and
    the sending terminal transmits at least one packet including the data to the data bus, and sends the error tolerance information to the address bus.

7. The communication device of claim 1, wherein if a condition for granting an error tolerance in relation to an error rate received from the other communication device is applied, from among the plurality of conditions regarding the bus system operation environment, the error processor generates error tolerance information corresponding to the received data according to an error tolerance scheme different from the determined error tolerance scheme.

8. The communication device of claim 1, wherein:
    a packet of first data with a relatively large acceptable delay amount and a packet of second data with a relatively small acceptable delay amount are transmitted over the bus;
    a first transmission path to the other communication device, and a second transmission path of which a path length is shorter than the first transmission path are present along the bus; and
    if a condition for granting an error tolerance in relation to a path length of the bus to the other communication device is applied, from among the plurality of conditions regarding the bus system operation environment, the error processor generates error tolerance information corresponding to the packet of the first data; and
    the sending terminal transmits at least one packet including the error tolerance information and the data to the first transmission path.

9. A communication device for use in a bus system of a semiconductor circuit having a sending node and a receiving node for transmitting data by a packet switching scheme, the communication device comprising:
    a receiving terminal which receives at least one packet including data and error tolerance information from a communication device set of claim 1;
    an error processor which carries out an error correction process for the at least one packet by utilizing the error tolerance information; and a sending terminal which sends the at least one packet having undergone the error correction process to the receiving node.

10. A router for use in a bus system for relaying a packet, the router comprising a communication device of claim 1.

11. A bus system of a semiconductor circuit comprising:
a sending node which sends one or more packets including data;
a first communication device of claim 1 receiving the one or more packets, which sends at least one packet including the data and the error tolerance information to the bus;
a second communication device of claim 9 receiving the at least one packet sent from the first communication device, which sends one or more packets of the data having undergone the error correction process; and
a receiving node which receives the one or more packets of the data sent from the second communication device.

12. The bus system of claim 11, further comprising a router for relaying the packet.

13. The bus system of claim 11, wherein:
the sending node and the first communication device are provided on a first semiconductor chip circuit;
the second communication device and the receiving node are provided on a second semiconductor chip circuit different from the first semiconductor chip circuit; and
the first semiconductor chip circuit and the second semiconductor chip circuit are connected together by a bus.

14. A circuit board of a semiconductor circuit having a bus system of claim 11.

* * * * *